United States Patent
Robison et al.

(10) Patent No.: US 10,742,427 B2
(45) Date of Patent: Aug. 11, 2020

(54) TAMPER-PROOF SECURE STORAGE WITH RECOVERY

(71) Applicant: Dell Products, L.P., Round Rock, TX (US)

(72) Inventors: Charles D. Robison, Buford, GA (US); Carlton A. Andrews, Austin, TX (US); Girish S. Dhoble, Austin, TX (US); Joseph Kozlowski, Hutto, TX (US); Andrew T. Fausak, Coppell, TX (US); David Konetski, Austin, TX (US); Ricardo L. Martinez, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 278 days.

(21) Appl. No.: 15/814,476

(22) Filed: Nov. 16, 2017

(65) Prior Publication Data
US 2019/0149341 A1 May 16, 2019

(51) Int. Cl.
*H04L 9/32* (2006.01)
*H04L 29/06* (2006.01)
*H04L 9/08* (2006.01)

(52) U.S. Cl.
CPC .......... *H04L 9/3268* (2013.01); *H04L 9/0825* (2013.01); *H04L 9/0891* (2013.01); *H04L 9/0894* (2013.01); *H04L 9/0897* (2013.01); *H04L 63/0442* (2013.01)

(58) Field of Classification Search
CPC ..................................................... H04L 9/3268
See application file for complete search history.

(56) References Cited

U.S. PATENT DOCUMENTS

| | | | |
|---|---|---|---|
| 8,316,237 B1 * | 11/2012 | Felsher | H04L 9/0825 380/282 |
| 10,430,565 B2 * | 10/2019 | Moritz | |
| 2003/0046238 A1 * | 3/2003 | Nonaka | G06F 21/10 705/51 |
| 2008/0126766 A1 * | 5/2008 | Chheda | G06F 9/3017 712/226 |
| 2011/0289324 A1 * | 11/2011 | Yellepeddy | G06F 21/79 713/189 |
| 2016/0154981 A1 * | 6/2016 | Wesselhoff | G06F 21/87 726/34 |

* cited by examiner

*Primary Examiner* — Simon P Kanaan
(74) *Attorney, Agent, or Firm* — Fogarty LLP

(57) ABSTRACT

Systems and methods for tamper-proof detection triggering of automatic lockdown using a recoverable encryption mechanism issued from a secure escrow service. In an illustrative, non-limiting embodiment, an Information Handling System (IHS) may include: a processor; a secure storage device coupled to the processor, wherein the secure storage device comprises a container encrypted with a derived container key; and a memory coupled to the processor, the memory including program instructions stored thereon that, upon execution, cause the IHS to: receive a digital certificate from a remote server, wherein the digital certificate includes a public key and, in response to a detection of a tampering event, encrypt the derived container key using the public key.

20 Claims, 3 Drawing Sheets

TAMPER-PROOF SECURE STORAGE WITH RECOVERY

FIELD

The present disclosure generally relates to Information Handling Systems (IHSs), and, more particularly, to systems and methods for tamper-proof secure storage with recovery.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

If an intruder obtains physical access to an information handling system, it is possible for that intruder to monitor the system's code execution, memory state, bus traffic, debug ports, hard drives, ports, and so on; thereby accessing key values and other protected data. Conventional attempts to address this problem include implanting bugs into the information handling system that probe communication lines, such as internal serial buses. However, it is prohibitively expensive to secure all buses within such a system.

As the inventors hereof have recognized, some secure storage devices may be encrypted by a key that can be cleared upon intrusion, but this is process is irrevocable and the data is effectively lost forever. Also, chassis intrusion detection mechanisms are often backed by a coin cell battery or the like. Failure of the battery can also invoke intrusion detection and also irrevocably wipe the key storage.

To address these, and other problems, the inventors hereof have developed systems and methods that provide recovery of the stored keys to avoid permanent data loss in response to intrusion, battery failure, other tampering events, or the like.

SUMMARY

Embodiments of systems and methods for tamper-proof secure storage with recovery are described. In an illustrative, non-limiting embodiment, an Information Handling System (IHS) may include: a processor; a secure storage device coupled to the processor, wherein the secure storage device comprises a container encrypted with a derived container key; and a memory coupled to the processor, the memory including program instructions stored thereon that, upon execution, cause the IHS to: receive a digital certificate from a remote server, wherein the digital certificate includes a public key; and in response to a detection of a tampering event, encrypt the derived container key using the public key.

In various implementations, the IHS may also include sensor coupled to the processor, the sensor configured to detect the tampering event under control of a Basic Input/Output System (BIOS) and independently of the operation of any Operating System (OS) in execution by the IHS. The sensor may include one or more of: a current sensor, a voltage sensor, a movement sensor, a pressure sensor, a microphone, a temperature sensor, or an optical sensor. Additionally or alternatively, the sensor may include a biometric sensor.

In some cases, a tampering event may be triggered by another remote server distinct from the IHS. Additionally or alternatively, the tampering event may be triggered in response to the other remote server receiving IHS usage data and identifying a pattern indicative of tampering in the IHS usage data. For example, IHS usage data may include mechanical shock events. Moreover, IHS usage data may indicate a geo-fence violation.

In various implementations, the program instructions, upon execution, may cause the IHS to: receive a tamper policy setting from a user of the IHS; determine that a type of the tampering event matches a selected type included in the tamper policy setting; and take an action corresponding to the selected type. For instance, the action may include electronically notifying the user or an administrator of the tampering event.

In addition, the program instructions, upon execution, may cause the IHS to: establish a secure communication channel with the remote server; transmit the public key-encrypted derived container key to the remote server; and receive a decrypted derived container key from the remote server in response to the remote server decrypting the public key-encrypted derived container key using a private key associated with the digital certificate. The program instructions, upon execution, may also the IHS to restore access to the secure storage by replacing the public key-encrypted derived container key with the decrypted derived container key.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
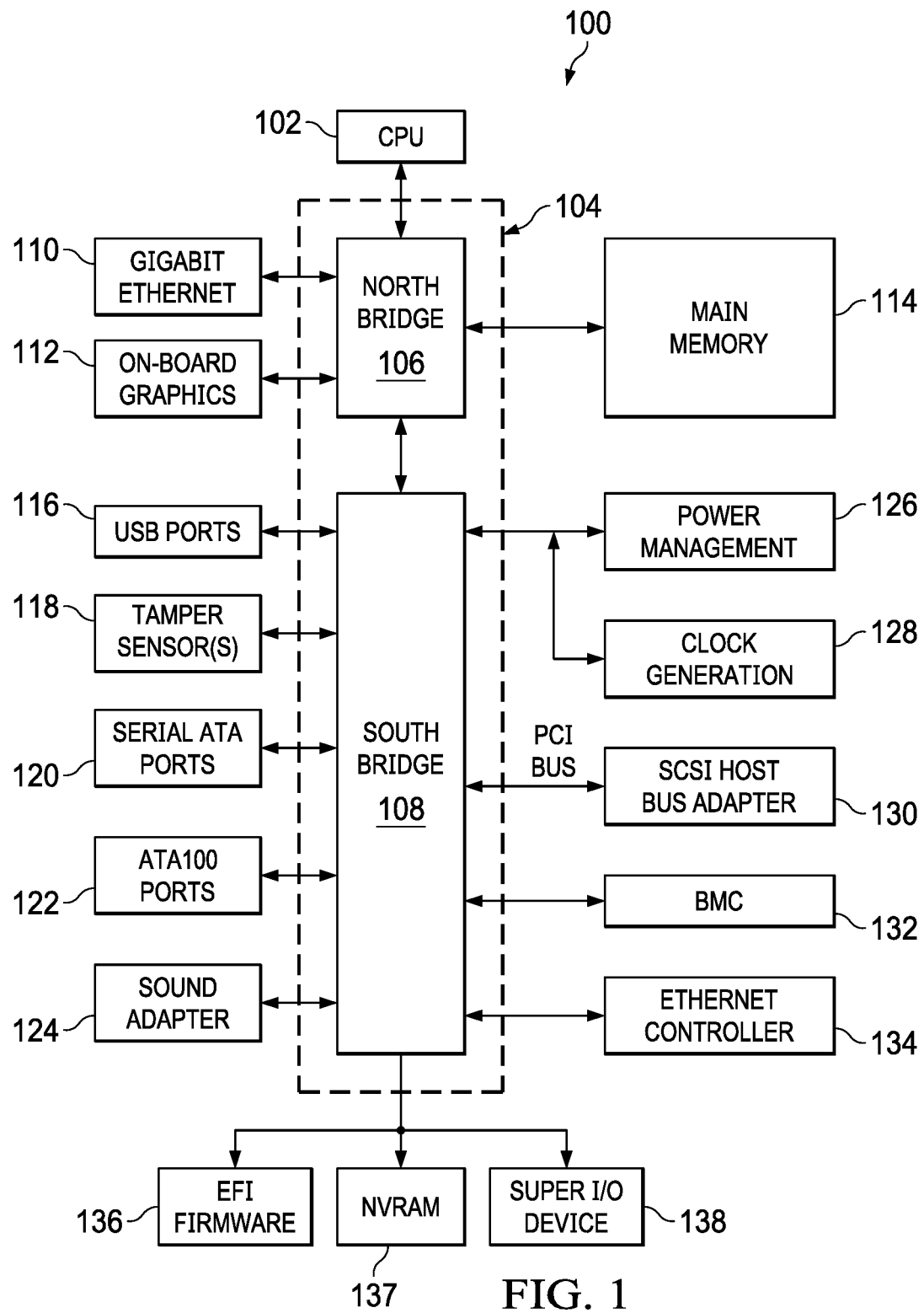
FIG. 1 illustrates an example of an Information Handling System (IHS) implementation according to some embodiments.

Systems and methods described herein may provide tamper-proof secure storage with recovery. In some embodiments, these systems and methods may enable tamper detection triggering automatic lockdown, using a recoverable encryption mechanism provided via a remote, secure escrow service. Additionally or alternatively, these systems and methods may enable remote triggering through an out-of-band management system of tamper detection. Additionally or alternatively, these systems and methods may enable recoverability of local keys to a protected storage device by restoring the escrowed key.

In some cases, a Basic Input/Output System (BIOS) of an Information Handling System (IHS) may have pre-encrypted the data on any BIOS-accessible storage (e.g., a Trusted Platform Module or TPM, or any other secure storage device), or on a Hard Disk Drive of any type, with a derived container key. When a tampering event is detected, the derived container key may be then encrypted with a public key previously delivered as part of a pre-provisioning certificate issued by the secure escrow service. The encryption of the derived container key therefore makes the stored data inaccessible by the local machine, user, or BIOS, until recovered using the certificate's corresponding private key that is maintained by the secure escrow service only. Intrusion detection may also be triggered by a remote management system using either in-band or out-of-band techniques for providing remote device lock-down.

To facilitate a secure recovery mechanism, the user may be able to recover their derived container key through a remote service. Encrypted data may be sent to a remote service to be decrypted with a private key, such that the derived container key is then made available and sent to the IHS to access the protected storage. Key recoverability may be managed remote database, and may be used as a key enabler when coupled with out-of-band key management to create a viable user experience. Moreover, the derived container key is not stored after it is recovered by the remote database.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

FIG. 1 shows an example of an IHS configured to implement the systems and methods described herein. It should be appreciated that although certain embodiments described herein may be discussed in the context of a desktop or server computer, other embodiments may be utilized with virtually any type of IHS. In this example, the IHS is configured to facilitate establishing CRTM for BIOS recovery images.

Particularly, the IHS includes a baseboard or motherboard, which is a printed circuit board (PCB) to which components or devices are mounted to by way of a bus or other electrical communication path. For example, Central Processing Unit (CPU) 102 operates in conjunction with a chipset 104. CPU 102 is a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, and Ethernet controller 134.

In various implementations, IHS 100 may include one or more electro-mechanical tamper detection switch(es) or sensor(s) 118 coupled to southbridge 108. Examples of tamper detection switch(es) or sensor(s) 118 may include, but are not limited to: electrical current sensors, electrical voltage sensors, movement sensors, pressure sensors, sound sensors, temperature sensors, and/or optical sensors. In some cases, tamper detection switch(es) or sensor(s) 118 may include biometric sensors (e.g., fingerprint, retina, face, voice, etc.) that may be used for local authentication purposes.

Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Referring back to tamper detection switch(es) or sensor(s) 118, it should be noted that, in some cases, two or more tampering sensors may be used in the same IHS 100 chassis, case, or enclosure. For example an electro-mechanical tampering sensor may determine that a latch has been opened or closed, and therefore a lid, panel, display, or door that exposes IHS 100 has been opened. A photosensor may determine whether or not light is sensed (e.g., on a motherboard), such that external light entering the enclosure through the lid, panel, display, or door, independently triggers a tampering or intrusion event.

In some cases, information from two or more tampering sensors of the same or different types may be combined to confirm that tampering is taking place. For example, if a first latch is open, but two or three remaining latches are still closed, the IHS may warn an operator of the potential problem without taking any other responsive action.

Additionally or alternatively, information from two or more tampering sensors of the same or different types may be combined such that responsive actions may be taken in stages. For example, in a first stage, a first set of one or more responsive actions may be performed when a mechanical latch is broken but no light yet enters the chassis (e.g., by encrypting a derived container key otherwise usable to access a secure storage device). In a second stage, a second set of one or more responsive action(s) may be performed when light impinges upon the photosensor (e.g., shutting down the IHS, rerouting connected devices in order of priority, etc.).

In many embodiments, tamper detection switch(es) or sensor(s) 118 may include electrical, thermal, photo, and/or mechanical sensors, devices, or switches configured to sense physical or environmental changes to IHS 100.

Figure 2A:
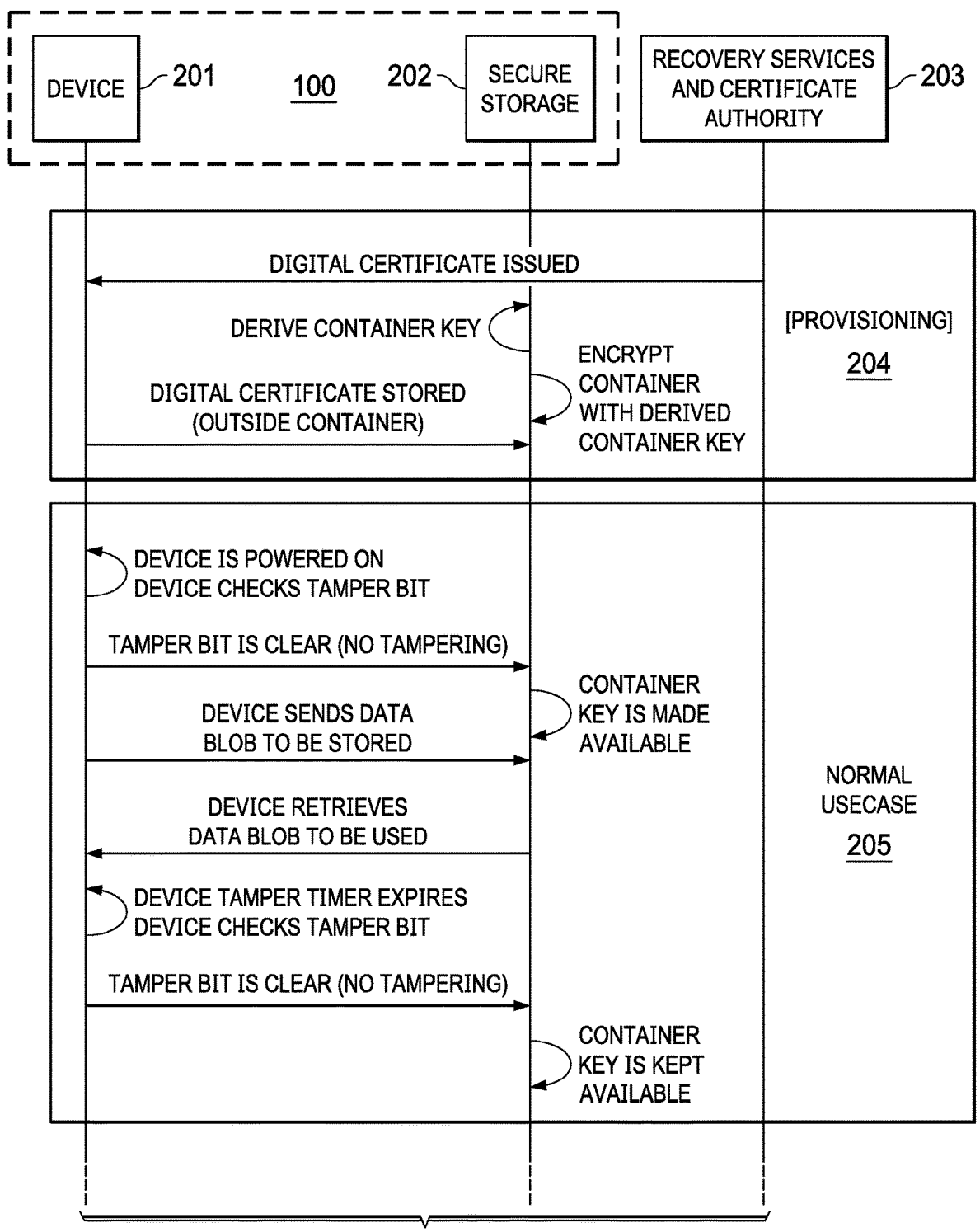
FIGS. 2A-B illustrate an example of a method for tamper-proof secure storage with recovery according to some embodiments.
Figure 2B:
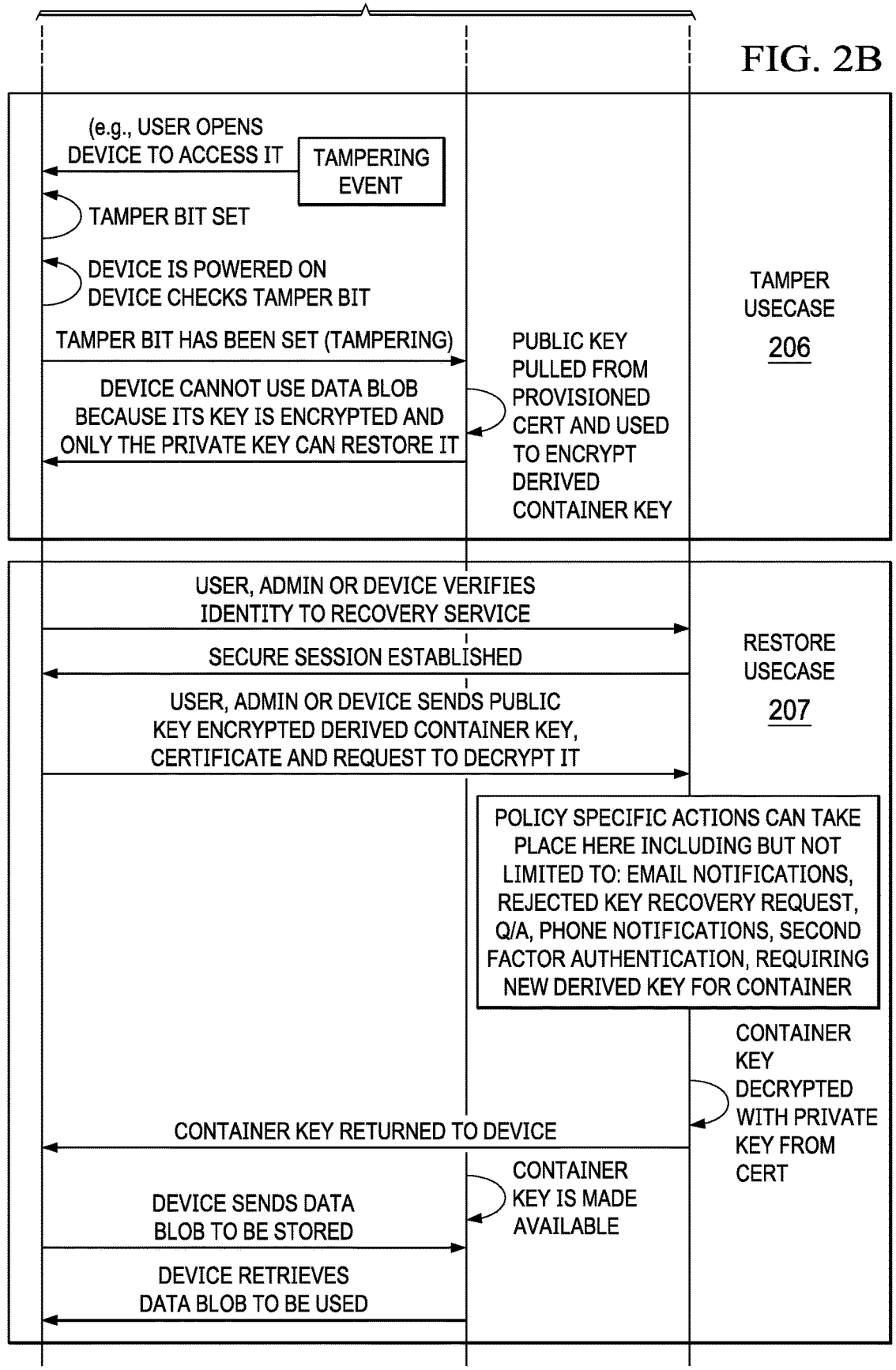

FIGS. 2A-B illustrate an example of method 200 for tamper-proof secure storage with recovery. In some embodiments, method 200 may be performed, at least in part, by device 201 (a processor) and secure storage 202 (e.g., a hard disk drive) of IHS 100, in conjunction and/or in cooperation with recovery services and/or certificate authority (CA) 203. Particularly, method 200 may be performed entirely out-of-band (OOB), underneath the devices' Operating System, in contradistinction with software-only techniques, using the BIOS as the enforcement for OOB tamper triggering.

As illustrated, method 200 may include provisioning phase 204, normal use case 205, tamper use case 206, and restore use case 207. In some embodiments, method 200 may be initiated upon completion, by a user, of a tamper policy or the like. The tamper policy may comprise settings received from the user that associate a selected type of tampering event with a distinct action to be taken in response to that particular detection. Examples of types of events include, but are not limited to: tamper sensor-triggered, or remotely triggered by a remote server.

During provisioning 204, CA 203 issues a digital tamper protection certificate to device 201. The certificate may be an electronic document used to prove the ownership of a public key. The certificate includes information about the public key, information about the identity of the public key's owner (the subject), and the digital signature of an entity that has verified the certificate's contents (the issuer). If the signature is valid, and the software examining the certificate trusts the issuer, then it can use that key to communicate securely with the certificate's subject.

Still during provisioning phase 204, secure storage 202 may derive a local derived container key, and it may encrypt a container (e.g., an HDD, an HDD volume, partition, etc.) with the derived container key. The digital certificate may also be stored on secure storage 202, for example, outside of the container.

During normal use case 205, device 201 is powered on and checks the status of a register, flag, or bit ("tamper bit") that indicates whether sensor 118 has detected a tampering event. During normal use case 205, the tamper bit is clear (indicating no tampering) and therefore the derived container key is made available to device 201. That is, device 201 can send data to be stored and can receive data to be used from secure storage 202. Upon expiration of a timer, device 201 may again check the tamper bit and, if the tamper bit is still clear, the derived container key is still made available. (In other implementations, however, timers need not be used.)

In tamper use case 206, a local tampering event may be detected (e.g., a user opens IHS 100), a battery is drained, a threshold number of failed login attempts is reached, etc. Additionally or alternatively, the tampering event may be triggered by a remote service, such that the tamper bit is also set. For example, the tampering event may be triggered in response to the other remote server receiving IHS usage data and identifying a pattern indicative of tampering in the IHS usage data.

In some cases, the IHS usage data may include mechanical shock events, and the tampering event may be triggered by identifying a higher incidence of shock events compared to historical user behavior. Additionally or alternatively, the IHS usage data may include violation of a geo-fence (e.g., a physical location outside of a geographic area defined by latitude/longitude, a circumference of a given radius, or the like).

When device 201 is powered on (or awakes from a low power state), it checks the tamper bit and informs secure storage 202 that the tamper bit has been set. In response, the public key is pulled from the digital certificate and used to encrypt the derived container key. As a result, device 201 cannot use the data stored in secure storage 202 because the derived container key is encrypted and only a corresponding private key (managed by CA 203) can restore it.

During restore use case 207, a user or administrator, for example, verifies their identity with recovery service 203 and establishes a secure communication session. The user or administrator send the public key-encrypted derived container key, the certificate, and a request to decrypt the derived container key to recovery service 203. Depending upon the tamper policy associated with the user, for instance, action that can take place include, but are not limited to: email notifications, rejected key recovery request, Q/A, phone notifications, second factor authentication, requiring new derived container key for container, etc.

Still while in restore use case 207, recovery service 203 decrypts the derived container key with a private key associated with the certificate, and returns the decrypted derived container key to device 201. Secure storage 202 makes the derived container key available, and device 201 can again send data to be stored and can receive data to be used from secure storage 202. However, the derived container key is not stored by the recovery service.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a secure storage device coupled to the processor, wherein the secure storage device comprises a container encrypted with a derived container key; and
a memory coupled to the processor, the memory including program instructions stored thereon that, upon execution, cause the IHS to:
receive a digital certificate from a remote server, wherein the digital certificate includes a public key; and
in response to a detection of a tampering event with regard to the IHS, encrypt the derived container key using the public key received from the remote server.

2. The IHS of claim 1, further comprising a sensor coupled to the processor, the sensor configured to detect the tampering event under control of a Basic Input/Output System (BIOS) and independently of the operation of any Operating System (OS) in execution by the IHS.

3. The IHS of claim 1, wherein the sensor comprises one or more of: a current sensor, a voltage sensor, a movement sensor, a pressure sensor, a microphone, a temperature sensor, or an optical sensor.

4. The IHS of claim 1, wherein the sensor comprises a biometric sensor.

5. The IHS of claim 1, wherein the tampering event is triggered by another remote server distinct from the IHS.

6. The IHS of claim 1, wherein the tampering event is triggered in response to the other remote server receiving IHS usage data and identifying a pattern indicative of tampering in the IHS usage data.

7. The IHS of claim 6, wherein the IHS usage data includes mechanical shock events.

8. The IHS of claim 6, wherein the IHS usage data indicates a geo-fence violation.

9. The IHS of claim 1, wherein the program instructions, upon execution, cause the IHS to:
receive a tamper policy setting from a user of the IHS;
determine that a type of the tampering event matches a selected type included in the tamper policy setting; and
take an action corresponding to the selected type.

10. The IHS of claim 1, wherein the action includes electronically notifying the user or an administrator of the tampering event.

11. The IHS of claim 1, wherein the program instructions, upon execution, cause the IHS to:
   establish a secure communication channel with the remote server;
   transmit the public key-encrypted derived container key to the remote server; and
   receive a decrypted derived container key from the remote server in response to the remote server decrypting the public key-encrypted derived container key using a private key associated with the digital certificate.

12. The IHS of claim 11, wherein the program instructions, upon execution, cause the IHS to:
   restore access to the secure storage by replacing the public key-encrypted derived container key with the decrypted derived container key.

13. A hardware memory device having program instructions stored thereon that, upon execution by an Information Handling System (IHS), cause the IHS to:
   receive a digital certificate from a remote server, wherein the digital certificate includes a public key; and
   in response to a detection of a tampering event with regard to the IHS, encrypt a derived container key using the public key received from the remote server, wherein the derived container key is used to encrypt a container of a secure storage device.

14. The hardware memory device of claim 13, wherein the program instructions, upon execution by an Information Handling System (IHS), cause the IHS to:
   detect the tampering event using a sensor comprises one or more of: a current sensors, a voltage sensor, a movement sensor, a pressure sensor, a microphone, a temperature sensor, an optical sensor, or a biometric sensor.

15. The hardware memory device of claim 13, wherein the tampering event is triggered by another remote server distinct from the IHS.

16. The hardware memory device of claim 13, wherein the tampering event is triggered in response to the other remote server receiving IHS usage data and identifying a pattern indicative of tampering in the IHS usage data.

17. The hardware memory device of claim 13, wherein the program instructions, upon execution, cause the IHS to:
   establish a secure communication channel with the remote server;
   transmit the public key-encrypted derived container key to the remote server;
   receive a decrypted derived container key from the remote server in response to the remote server decrypting the public key-encrypted derived container key using a private key associated with the digital certificate; and
   restore access to the secure storage by replacing the public key-encrypted derived container key with the decrypted derived container key.

18. A method, comprising:
   receiving a digital certificate from a remote server, wherein the digital certificate includes a public key; and
   in response to a detection of a tampering event with regard to the IHS, encrypting a derived container key using the public key received from the remote server, wherein the derived container key is used to encrypt a container of a secure storage device.

19. The method of claim 18, further comprising:
   detecting the tampering event using a sensor comprises one or more of: a current sensors, a voltage sensor, a movement sensor, a pressure sensor, a microphone, a temperature sensor, an optical sensor, or a biometric sensor.

20. The method of claim 18, further comprising:
   establishing a secure communication channel with the remote server;
   transmitting the public key-encrypted derived container key to the remote server;
   receiving a decrypted derived container key from the remote server in response to the remote server decrypting the public key-encrypted derived container key using a private key associated with the digital certificate; and
   restoring access to the secure storage by replacing the public key-encrypted derived container key with the decrypted derived container key.

* * * * *